United States Patent Office 3,660,414

Patented May 2, 1972

3,660,414

CERTAIN 5-ARYL-2-AMINO-NICOTINONITRILES

Goetz E. Hardtmann, Florham Park, N.J., assignor to Sandoz-Wander, Inc., Hanover, N.J.

No Drawing. Filed June 1, 1970, Ser. No. 42,539
Int. Cl. C07d 31/46
U.S. Cl. 260—294.9 1 Claim

ABSTRACT OF THE DISCLOSURE

The invention discloses processes for the preparation of 5-aryl-2-amino-nicotinonitriles.

The present invention relates to processes for preparation of compounds of the Formula I:

wherein

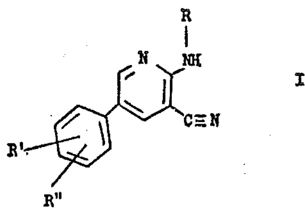

R is lower alkyl of 1 to 6 carbon atoms, allyl, methallyl, propargyl or cycloalkyl of 3 to 6 carbon atoms, and each of R′ and R″ is independently hydrogen, halo of atomic weight of from 19 to 80 or lower alkoxy of 1 to 3 carbon atoms.

In accordance with the present invention the compounds of the Formula I may be obtained by:

(A) by subjecting in a Reaction A a compound of the Formula II:

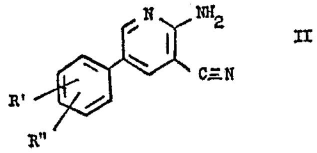

in which R′ and R″ are as defined, to reaction with a compound of the Formula III:

X—R (III)

in which X is chloro, bromo or iodo and R is as above defined; or (B) by subjecting in a Reaction B a compound of the Formula IV:

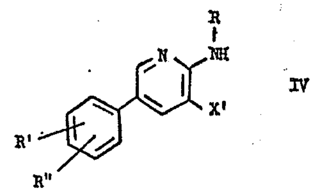

in which R, R′ and R″ are as defined and X′ is chloro or bromo, preferably bromo, to reaction with cuprous cyanide, and decomposing the resulting cuprous complex; or (C) by subjecting in a Reaction C a compound of the Formula V:

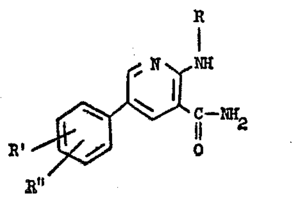

in which R, R′ and R″ are as above defined, to reaction with a phosphorus halide; or (D) by subjecting in a Reaction D a compound of the Formula VI:

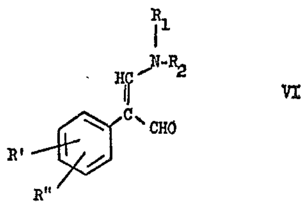

in which R′ and R″ are as defined and each of $R_1$ and $R_2$ is lower alkyl of 1 to 3 carbon atoms, to reaction with a compound of the Formula VII:

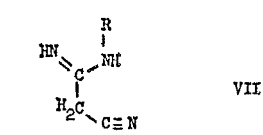

in which R is above defined.

The preparation of compound I by Reaction A is carried out at elevated temperatures preferably in the range of from 60° C. to 150° C., more preferably 80° C. to 130° C. The reaction is carried out in an inert liquid medium which may be provided by employing an excess of the compound III when liquid or liquified under the reaction conditions. Organic solvents of conventional type which are inert under the reaction conditions may be employed including, for example, dioxane, benzene and toluene. The reaction is desirably effected in the presence of an acid binding agent such as an inorganic base such as an alkali metal hydroxide, an inorganic carbonate such as an alkali metal carbonate or tertiary amine, preferably an alkali metal carbonate such as sodium carbonate or potassium carbonate. The desired reaction product of Formula I may be isolated from the reaction mixture of Reaction A by working up by established procedures.

The preparation of compounds of Formula I by Reaction B involving the reaction of a compound IV with cuprous cyanide is suitably carried out at elevated temperature and in the presence of an organic solvent which is inert under the reaction conditions. The reaction temperature may, for example, range from about 60° C. to 200° C. and preferably 80° C. to 180° C. The preferred solvents are solvents boiling within the preferred range of reaction temperatures in order that reflux conditions may be employed, e.g., dimethylacetamide and dimethylformamide, more preferably dimethylacetamide. The mole ratio of cuprous cyanide to compound of Formula IV in the reaction mixture is not particularly critical and typically ranges from approximately the stoichiometric amount required to form the desired product up to a moderate excess. The reaction time is typically about 1 to 20 hours. The substituent X′ in the compound of Formula IV is preferably a bromine atom. The decomposition of the resulting cuprous complex may, for example, be effected by addition of methylene chloride, and the reaction product of Formula I may be isolated from the reaction mixture by working up by established procedures.

The preparation of compounds I by Reaction C is preferably carried out at elevated temperatures in the range of from 40° C. to 120° C., more preferably 50° C. to 100° C. The phosphorus halide is a pentavalent phosphorus compound such as phorphorus pentachloride, phosphorus pentabromide, phosphorus oxychloride or phosphorus oxybromide. The reaction is carried out in an inert liquid medium which may be provided by employing an excess of the normally liquid phosphorus halide, e.g., phosphorus oxychloride, and/or by employing an inert organic solvent of conventional type such as the chlorine-containing solvents, e.g., methylene chloride. The preferred phosphorus halide is phosphorus oxychloride. The reaction product of Formula I may be isolated from the reaction mixture of Reaction C by working up by established procedures.

The preparation of compound I by Reaction D involving the reaction of a compound VI with a compound VII may be carried out at temperatures in the range of from 10° C. to 50° C., preferably 20° C. to 35° C. The reaction is desirably effected in the presence of a strong organic base such as an alkali metal alkoxide, e.g., sodium methoxide and potassium t-butoxide. The reaction is suitably effected in an inert solvent medium which may be provided by employing any of several of the conventional organic solvents, preferably a lower alkanol such as methanol, ethanol and t-butanol. The reaction product of Formula I may be isolated from the reaction mixture of Reaction D by working up by established procedures.

The compounds of Formula VI employed as starting material in Reaction D are known or may be prepared from known materials by conventional procedures. The compounds of the Formula VII may be prepared from known materials by procedures described in the literature for compounds of this general type, for example, as described by Fusco et al., Gazz. Chim. Ital. 97 (3), 410–420 (1967).

The compounds of the Formula II are novel compounds which may be prepared in a Step 1 reaction by subjecting a compound of the Formula VIII:

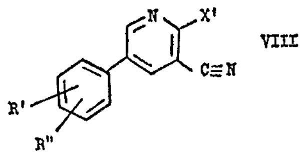

where R', R'' and X' are as defined, to reaction with ammonia.

The reaction of Step 1 is conveniently carried out at temperatures in the range of from 10° C. to 50° C., preferably 20° C. to 30° C. The reaction is desirably carried out in the presence of a suitable solvent such as ethanol. The compound VIII employed as starting material in the Step 1 reaction are either known or may be prepared from known materials by established procedures as described, for example, in Bull. Soc. Chim. (France), 1966, 2387.

The compounds of the Formula IV are novel compounds which may be prepared by alkylating in a Step 2 a compound of the Formula IX:

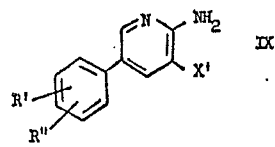

wherein R', R'' and X' are as above defined.

The preparation of compound IV from compound IX in Step 2 may be carried out in accordance with conventional procedures for alkylation of an amino moiety, for example, by tosylation, alkylation and detosylation or by direct alkylation followed by separation of undesired by-products in accordance with established separation procedures. When R in the compound V is a branched substituent with the branching occurring on the carbon atom to be placed adjacent the nitrogen atom of the amino moiety, direct alkylation at temperature between about 60° C. to 120° C. is preferred as affording high yields and an efficient preparation of compound V. The compounds of Formula IX employed as starting material in Step 2 may be prepared in accordance with procedures analogous for preparation of similar compounds as described in liaterature, for example, by P. A. Villiers et al., Rec. Trav. Chim. 76, 647–656 (1957).

Compound IV may be also prepared by reacting in a Step 2–a a compound IX–a:

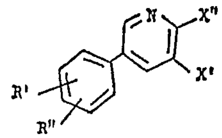

wherein R', R'' and X' are as defined and X'' is chloro or bromo of equal or greater atomic weight than X', with a compound XV:

$$\text{HR} \qquad \text{XV}$$

wherein R is as above defined.

The reaction of Step 2–a is carried out in a known manner at temperatures in the range of 60° C. to 90° C. employing an excess of the compound XV which also serves as a liquid medium for the reaction when liquid or liquidified under the reaction conditions. The compound IX–a are either known or may be prepared from known materials by established procedures.

The compounds of the Formula V are novel compounds which may be prepared by alkylating in a Step 3 a compound of the Formula X:

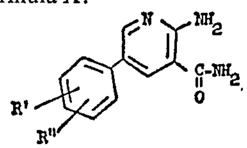

wherein R' and R'' are as above defined.

The reaction of Step 3 may be carried out similarly to the reaction of Step 2. The compound of Formula X may be prepared in accordance with procedures analogous to those described in the literature for the preparation of similar compounds, for example, as described in J.A.C.S. 81, 2448 and J.A.C.S. 82, 6058.

The compounds of the Formula V may be also prepared according to the following reaction scheme:

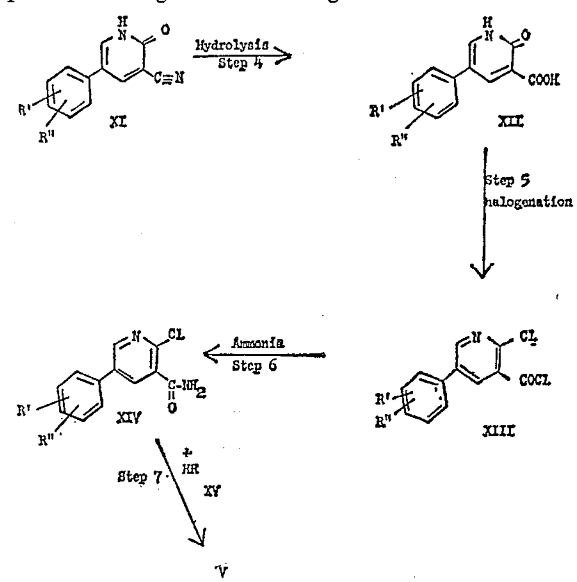

wherein R, R' and R'' are as above defined.

The hydrolysis of Step 4 is suitably carried out in a known manner at temperature in the range of from 20° C. to 80° C., more usually 30° C. to 70° C., employing about a dilute aqueous solution of an alkali metal hydroxide, e.g., a 50% aqueous solution of sodium hydroxide. The hydrolysis is desirably effected in a water miscible organic solvent of known type, e.g., a lower alkanol such as ethanol.

The preparation of compounds XIII from a compound XII by Step 5 is suitably carried out in a known manner for halogenating both a keto and acid function, preferably by reacting a compound XII with phosphorus oxychloride with phosphorus pentachloride as co-reactant. The reaction is suitably effected at temperatures in the range of from 50° C. to 150° C., preferably 70° C. to 100° C. The reaction is carried out in an inert liquid medium which may be conveniently provided by employing an excess of the phosphorus oxychloride. Conventional organic solvents inert under the reaction conditions may also be employed including, for example, the chlorine-containing solvents such as 1,2-dichloroethane.

The preparation of compounds XIV in Step 6 involving subjecting a compound XIII to reaction with ammonia is a conventional procedure suitably carried out at temperature of from about 10° C. to 50° C., preferably 20° C. to 35° C. Ethanol may be suitably employed to provide an inert solvent medium for the reaction.

The preparation of compounds V from a compound XIV by reacting the latter in a Step 7 with a compound XV represents a reaction of well known type suitably effected at temperatures in the range of from 30° C. to 150° C., preferably 80° C. 135° C. The reaction is desirably carried out employing an excess of the compound XV which may also serve as a liquid medium for the reaction when liquid or liquified under the reaction conditions.

The compounds of Formula XI employed as starting material in Step 4 are either known or may be prepared from known materials by established procedures.

The compounds of the Formula I are useful as intermediates in preparation of pharmacologically active 4,6-diaryl-1-substituted-pyrido[2,3-d]pyrimidin-2-ones as described in my copending application Ser. No. 42,538, filed June 1, 1970. In addition, the compounds of Formula I are also useful an anti-inflammatory agents as also indicated in said co-filed application.

I claim:

1. A compound of the formula:

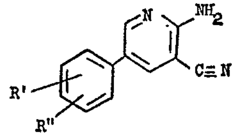

wherein R′ and R″ is independently hydrogen, halo of an atomic weight of from 19 to 80 or lower alkoxy.

References Cited

Schmidt: Chem. Ber., 98 (12), pp. 3892–3901 (1965).

ALAN L. ROTMAN, Primary Examiner

U.S. Cl. X.R.

260—295.5 R, 295.5 A, 296 R, 256.4 F, 999